United States Patent
Shi et al.

(10) Patent No.: US 10,411,599 B1
(45) Date of Patent: Sep. 10, 2019

(54) BOOST AND LDO HYBRID CONVERTER WITH DUAL-LOOP CONTROL

(71) Applicant: QUALCOMM Incorporated, San Diego, CA (US)

(72) Inventors: Chunlei Shi, San Diego, CA (US); Jongrit Lerdworatawee, San Diego, CA (US); Yu Pu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/937,947

(22) Filed: Mar. 28, 2018

(51) Int. Cl.
- *H02M 3/156* (2006.01)
- *H02M 3/158* (2006.01)
- *G05F 1/26* (2006.01)
- *H02M 1/00* (2006.01)
- *G05F 1/45* (2006.01)

(52) U.S. Cl.
CPC ............ *H02M 3/1582* (2013.01); *G05F 1/26* (2013.01); *G05F 1/452* (2013.01); *H02M 2001/0032* (2013.01); *H02M 2001/0045* (2013.01)

(58) Field of Classification Search
CPC .......................................... H02M 2001/0045
See application file for complete search history.

(56) References Cited

U.S. PATENT DOCUMENTS

| | | |
|---|---|---|
| 5,631,598 A | 5/1997 | Miranda et al. |
| 6,046,577 A | 4/2000 | Rincon-Mora et al. |
| 6,147,550 A | 11/2000 | Holloway |
| 6,188,211 B1 | 2/2001 | Rincon-Mora et al. |
| 6,188,212 B1 | 2/2001 | Larson et al. |
| 6,359,427 B1 | 3/2002 | Edwards et al. |
| 6,522,111 B2 | 2/2003 | Zadeh et al. |
| 6,586,917 B1 | 7/2003 | Smith |
| 6,617,832 B1 | 9/2003 | Kobayashi |
| 6,791,390 B2 | 9/2004 | Gay |

(Continued)

FOREIGN PATENT DOCUMENTS

| | | |
|---|---|---|
| CN | 1175018 A | 3/1998 |
| EP | 1253498 A1 | 10/2002 |
| WO | 2014042726 A1 | 3/2014 |

OTHER PUBLICATIONS

Akhamal H., et al., "Fast Transient Response Low Drop-out Voltage Regulator," International Journal of Embedded Systems and Applications (IJESA), Sep. 2014, vol. 4, No. 2/3, pp. 1-10.

(Continued)

*Primary Examiner* — Harry R Behm
(74) *Attorney, Agent, or Firm* — Qualcomm Incorporated

(57) ABSTRACT

A boost and LDO hybrid converter with dual-loop control is disclosed. In some implementations, a hybrid converter includes an inductor having a first terminal to receive an input voltage and a second terminal; an n-type metal oxide semiconductor device (nMOS) having a drain coupled to the second terminal of the inductor; a p-type metal oxide semiconductor device (pMOS) having a gate, a drain, and a source, the source coupled to the second terminal of the inductor; an output capacitor having a first terminal coupled to the drain of the first pMOS; and a controller having a switch driver and a buffer, wherein the controller is configured to use the switch driver to drive the gate of the first pMOS in a boost mode and to use the buffer to drive the gate of the first pMOS in a low drop out (LDO) mode.

13 Claims, 7 Drawing Sheets

(56) References Cited

U.S. PATENT DOCUMENTS

| | | | |
|---|---|---|---|
| 6,856,124 B2 | 2/2005 | Dearn et al. | |
| 7,109,690 B2 | 9/2006 | Ke et al. | |
| 7,492,137 B2 | 2/2009 | Yamada | |
| 7,504,814 B2 | 3/2009 | Lee et al. | |
| 7,548,051 B1 | 6/2009 | Tenbroek et al. | |
| 7,710,090 B1 | 5/2010 | Kimura | |
| 8,072,196 B1 | 12/2011 | Li | |
| 8,248,150 B2 | 8/2012 | Tadeparthy et al. | |
| 8,294,441 B2 | 10/2012 | Gurcan et al. | |
| 8,841,893 B2 | 9/2014 | Bulzacchelli et al. | |
| 9,223,329 B2 | 12/2015 | Pulvirenti et al. | |
| 9,274,534 B2 | 3/2016 | Fang et al. | |
| 9,543,826 B2 | 1/2017 | Chen et al. | |
| 9,588,541 B1 | 3/2017 | Ho et al. | |
| 9,608,522 B2 | 3/2017 | Lin et al. | |
| 9,684,325 B1 | 6/2017 | Rasmus | |
| 9,740,225 B1 | 8/2017 | Wong | |
| 9,778,672 B1 | 10/2017 | Gao et al. | |
| 9,946,283 B1 | 4/2018 | Yung et al. | |
| 10,013,005 B1 | 7/2018 | Ippili | |
| 2004/0027097 A1* | 2/2004 | DeNicholas | G05F 1/10 323/222 |
| 2004/0140845 A1 | 7/2004 | Eberlein | |
| 2005/0189930 A1 | 9/2005 | Wu et al. | |
| 2005/0206444 A1* | 9/2005 | Perez | H03F 1/08 327/540 |
| 2005/0248331 A1 | 11/2005 | Whittaker et al. | |
| 2006/0164053 A1 | 7/2006 | Walter et al. | |
| 2006/0181258 A1 | 8/2006 | Benbrik | |
| 2007/0057655 A1* | 3/2007 | Nishida | H01M 10/44 323/282 |
| 2007/0139030 A1 | 6/2007 | Lee et al. | |
| 2007/0242536 A1 | 10/2007 | Matsubara | |
| 2008/0211467 A1* | 9/2008 | Huang | H02M 3/1588 323/271 |
| 2008/0278127 A1 | 11/2008 | Nagata | |
| 2008/0303496 A1 | 12/2008 | Schlueter et al. | |
| 2009/0010035 A1* | 1/2009 | Williams | H02M 3/158 363/131 |
| 2009/0179622 A1 | 7/2009 | Ivanov et al. | |
| 2009/0189591 A1 | 7/2009 | Sperling et al. | |
| 2009/0243568 A1* | 10/2009 | Nguyen | G05F 1/56 323/274 |
| 2009/0322429 A1 | 12/2009 | Ivanov et al. | |
| 2010/0213917 A1 | 8/2010 | Pulijala et al. | |
| 2010/0327959 A1 | 12/2010 | Lee | |
| 2011/0089916 A1 | 4/2011 | Soenen et al. | |
| 2012/0112718 A1 | 5/2012 | Pons | |
| 2012/0187897 A1* | 7/2012 | Lenk | H01M 10/44 320/101 |
| 2012/0229111 A1* | 9/2012 | Serdarevic | H02M 3/1582 323/282 |
| 2013/0082671 A1 | 4/2013 | Ivanov et al. | |
| 2013/0099764 A1 | 4/2013 | Zhang et al. | |
| 2013/0221940 A1 | 8/2013 | Yan et al. | |
| 2014/0042998 A1 | 2/2014 | Saito et al. | |
| 2014/0084896 A1 | 3/2014 | Zhang et al. | |
| 2014/0139198 A1 | 5/2014 | Manlove et al. | |
| 2014/0266103 A1 | 9/2014 | Wang et al. | |
| 2014/0277812 A1 | 9/2014 | Shih et al. | |
| 2014/0306676 A1 | 10/2014 | Hu et al. | |
| 2015/0028828 A1* | 1/2015 | Chen | H02M 3/158 323/268 |
| 2015/0103566 A1 | 4/2015 | Keogh et al. | |
| 2015/0115830 A1 | 4/2015 | Siessegger | |
| 2015/0130434 A1 | 5/2015 | Jain et al. | |
| 2015/0137780 A1 | 5/2015 | Lerner et al. | |
| 2015/0160668 A1* | 6/2015 | Pujol | G05F 1/565 323/280 |
| 2015/0168969 A1 | 6/2015 | Shor | |
| 2015/0192943 A1 | 7/2015 | Roham et al. | |
| 2015/0198959 A1 | 7/2015 | Kuttner | |
| 2015/0198960 A1 | 7/2015 | Zhang et al. | |
| 2015/0220096 A1 | 8/2015 | Luff | |
| 2015/0349622 A1 | 12/2015 | Lo et al. | |
| 2015/0362936 A1 | 12/2015 | Patel et al. | |
| 2016/0124448 A1 | 5/2016 | Murukumpet et al. | |
| 2016/0349776 A1 | 12/2016 | Conte et al. | |
| 2017/0117803 A1 | 4/2017 | Matsuki et al. | |
| 2017/0205841 A1 | 7/2017 | Jefremow et al. | |
| 2017/0212540 A1 | 7/2017 | Cho et al. | |
| 2017/0220059 A1 | 8/2017 | Kadowaki | |
| 2017/0322575 A1 | 11/2017 | Du et al. | |
| 2017/0364110 A1 | 12/2017 | Golara et al. | |
| 2017/0371365 A1 | 12/2017 | Kossel | |
| 2018/0217623 A1 | 8/2018 | Bhattad et al. | |
| 2019/0146532 A1 | 5/2019 | Ballarin et al. | |

OTHER PUBLICATIONS

Alon E., et al., "Replica Compensated Linear Regulators for Supply-Regulated Phase-Locked Loops," IEEE Journal of Solid-State Circuits, vol. 41, No. 2, Feb. 2006, pp. 413-424.

Assi A., et al., "A Fully Differential and Tunable CMOS Current Mode opamp Based on Transimpedance-Transconductance Technique", Circuits and Systems, 1997. Proceedings of the 40th Midwest Symposium on Sacramento, CA, USA Aug. 3-6, 1997, New York, NY, USA, IEEE, US, vol. 1, Aug. 3, 1997 (Aug. 3, 1997), pp. 168-171, XP010272437, DOI: 10.1109/MWSCAS.1997.666060, ISBN: 978-0-7803-3694-0.

Bontempo G., et al., "Low Supply Voltage, Low Quiescent Current, ULDO Linear Regulator," The 8th IEEE International Conference on Electronics, Circuits and Systems 2001, pp. 409-412.

Bulzacchelli J.F., et al., "Dual-Loop System of Distributed Microregulators With High DC Accuracy, Load Response Time Below 500 ps, and 85-mV Dropout Voltage," IEEE Journal of Solid-State Circuits, vol. 47, No. 4, Apr. 2012, pp. 863-874.

Camacho D., et al., "An NMOS Low Dropout Voltage Regulator with Switched Floating Capacitor Gate Overdrive," Department of Electrical Engineering, Southern Methodist University, Dallas, Texas, USA, 52nd IEEE International Midwest Symposium on Circuits and Systems, Aug. 2009, pp. 808-811.

Den Besten G.W., et al., "Embedded 5 V-to-33 V Voltage Regulator for Supplying Digital IC's in 3.3 V CMOS Technology," IEEE Journal of Solid-State Circuits, vol. 33, No. 7, Jul. 1998, pp. 956-962.

Gupta V., et al., "A Low Dropout, CMOS Regulator with High PSR over Wideband Frequencies", IEEE International Symposium on Circuits and Systems, May 2005, pp. 4245-4248.

Hazucha R, et al., "Area-Efficient Linear Regulator With Ultra-Fast Load Regulation", IEEE Journal of Solid-State Circuits, vol. 40, No. 4, Apr. 2005, pp. 933-940.

Huang H.Y., et al., "A Wideband CMOS Transconductance-Transimpedance Amplifier", Midwest Symposium on Circuits and Systems. Cairo, Egypt, Dec. 27-30, 2003; [Midwest Symposium on Circuits and Systems], Piscataway, NJ, IEEE, US, vol. 1, Dec. 27, 2003 (Dec. 27, 2003), pp. 153-156, XP010867413, DOI: 10.1109/MWSCAS.2003.1562241, ISBN: 978-0-7803-8294-7.

Lu Y., et al., "A 0.65ns-Response-Time 3.01ps FOM Fully-Integrated Low-Dropout Regulator with Full-Spectrum Power-Supply-Rejection for Wideband Communication Systems," IEEE International Solid-State Circuits Conference, Technical Papers, Feb. 2014, pp. 306-307. Retrieved from the Internet: URL:http://www.researchgate.net/publication/271550565.

Milliken R.J., et al., "Full on-chip CMOS low-dropout voltage regulator", IEEE Transactions on Circuits and Systems: Fundamental Theory and Applications, vol. 54, No. 9, Sep. 2007, pp. 1879-1890.

Rincon-Mora G.A., et al., "A Low-Voltage, Low Quiescent Current, Low Drop-Out Regulator," IEEE Journal of Solid-State Circuits, Jan. 1998, vol. 33, No. 1, pp. 36-44.

Teel J.C. "Understanding power supply ripple rejection in linear regulators", Analog Applications Journal, Analog and Mixed-Signal Products, 2005, 4 Pages.

\* cited by examiner

US 10,411,599 B1

BOOST AND LDO HYBRID CONVERTER WITH DUAL-LOOP CONTROL

FIELD OF DISCLOSURE

Aspects of the present disclosure relate generally to voltage converters, and more particularly to a boost and low drop out (LDO) hybrid converter with dual-loop control.

BACKGROUND

In many electronic systems today, a boost converter is commonly used to convert a low input voltage to a higher output voltage. The boost converter is particularly useful in low power mobile applications and/or Internet-of-Things (IoT) applications, for example, charging circuit in Bluetooth headphone. There are many applications where the input voltage has a wide range and could either be lower or higher than the output voltage. A single boost converter is not able to cover the entire voltage range in those scenarios.

Conventionally, several types of converters are developed to address the above problem. One such design is to use a non-inverting buck-boost converter to cover the entire range. FIG. 1 shows an example of a conventional non-inverting buck-boost converter. The buck-boost converter 100 includes a first p-type switch P1 110, a first n-type switch N1 120, an inductor L 130, a second n-type switch N2 140, a second p-type switch P2 150, and an output capacitor Cout 160. A source of P1 110 is coupled to an input voltage supply Vdd, and a drain of P1 is coupled to a first terminal of L 130 and a drain of N1 120. A source of N1 120 is coupled to ground. A second terminal of L 130 is coupled to a source of P2 150 and a drain of N2 140. A source of N2 140 is coupled to ground. A drain of P2 150 is coupled to one end of Cout 160. The other end of Cout 160 is coupled to ground.

The buck-boost converter 100 can be configured as either a buck down converter or a boost up converter to convert the input voltage Vdd. However, a complex control scheme is needed to control the four switches, namely, P1 110, P2 150, N1 120, and N2 140, to configure the converter 100 as a buck converter or a boost converter or a buck-boost converter. The four switches needed for power delivery also impose penalties on silicon area and efficiency. Further, the number of pins required in such design is one more than the number of pins required in a conventional regular boost converter.

Another prior design uses a boost converter and a low drop out converter (LDO) in series. FIG. 2 shows a conventional converter 200 having a boost converter and a LDO coupled in series. The converter 200 includes an inductor 210, a first n-type switch N1 220, a first p-type switch P1 230, a boost capacitor C_bst 240, a second p-type switch P2 260, a driver 250, and a LDO capacitor C_ldo 270. Specifically, the inductor 210, N1 220, P1 230, C_bst 240 can be configured as a boost converter 202; while P2 260, driver 250, and C_ldo 270 can be configured as a LDO 204. An input voltage Vin is applied to the inductor 210 and an output voltage Vout is taken at the drain of P2 160.

When input voltage Vin is less than output voltage Vout, boost converter 202 becomes active and boosts up the input voltage Vin. Then LDO 204 down converts the voltage or goes into bypass mode. When Vin is greater than Vout, boost converter 202 goes into bypass mode, and LDO 204 down converts the input voltage Vin.

As shown in FIG. 2, converter 200 needs three (3) switches for power delivery, namely, P1 230, N1 220, and P2 260. Like converter 100 in FIG. 1, the number of pins converter 200 requires is one more than the number of pins required in a conventional regular boost converter. Moreover, two (2) capacitors (i.e., C_bst 240 and C_ldo 270) are required in converter 200, that is one more than the converter 100 shown in FIG. 1. Thus, this design also uses large area on silicon. Further, the arrangement of boost converter 202 and LDO 204 in series imposes an efficiency penalty on the entire design.

FIG. 3 shows a third conventional converter design that uses a boost converter and a LDO in parallel. Converter 300 includes a boost converter 302 having an inductor 310, a n-type switch N1 320, a p-type switch 330, and an output capacitor C_out 360. Converter 300 further includes a LDO 304 having a p-type switch P2 340 and a driver 350. When input voltage Vin is less than output voltage Vout, boost converter 302 is turned on and LDO 304 is turned off. When input voltage Vin is greater than output voltage Vout, boost converter 302 is turned off and LDO 304 is turned on.

Like converter 200 in FIG. 2, converter 300 uses three (3) switches for power delivery, namely, N1 320, P1 330, and P2 340. Thus, converter 300 still requires a large area on silicon. Further, both P1 330 and P2 340 need to have bi-directional block capability due to the parallel configuration.

Because of the various shortfalls of the existing converters discussed above, there is a need in the art to provide a more efficient hybrid boost and LDO converter design that occupies smaller area, especially for the mobile and IoT applications that demand compact design.

SUMMARY OF THE DISCLOSURE

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. The sole purpose of this summary is to present some concepts of one or more implementations in a simplified form as a prelude to the more detailed description that is presented later.

In some implementations, a hybrid converter includes an inductor having a first terminal to receive an input voltage and a second terminal; a first n-type metal oxide semiconductor device (nMOS) having a drain coupled to the second terminal of the inductor and a source coupled to ground; a first p-type metal oxide semiconductor device (pMOS) having a gate, a drain, and a source, the source coupled to the drain of the first nMOS and the second terminal of the inductor; an output capacitor having a first and a second terminal, the first terminal coupled to the drain of the first pMOS and the second terminal coupled to ground; and a controller having a switch driver and a buffer, wherein the controller is configured to use the switch driver to drive the gate of the first pMOS in a boost mode and to use the buffer to drive the gate of the first pMOS in a low drop out (LDO) mode.

The hybrid converter can further include a current sensor coupled across the inductor to provide a feedback current signal to a positive terminal of the controller. In some implementations, the hybrid converter further includes a compensation network coupled to an input of the buffer. The current sensor, the inductor, the compensation network, and the controller are configured as a current loop in the LDO mode.

In some implementations, the hybrid converter further includes an error amplifier coupled between the output capacitor and a negative input terminal of the controller to provide a feedback voltage to the controller. The error amplifier, the controller, the first pMOS, and the output capacitor are configured as a voltage loop in the LDO mode.

In some implementations, a method to provide a hybrid converter includes receiving an input voltage at a first terminal of an inductor of a hybrid converter. If the input voltage is less than an output voltage of the hybrid converter, configuring the hybrid converter as a boost converter. If the input voltage is greater than the output voltage, configuring the hybrid converter as a low drop out linear voltage regulator (LDO), and controlling the LDO using a voltage loop and a current loop.

The method can further include sensing a current through the inductor, wherein the inductor is part of the current loop; and providing a feedback signal based on the current sensed to a controller of the hybrid converter.

In some implementations, configuring the hybrid converter as the boost converter comprises driving a gate of a p-type metal oxide semiconductor device (pMOS) with a switch driver, wherein a source of the pMOS is coupled to a second terminal of the inductor, and a drain of the pMOS is coupled to a first terminal of an output capacitor. Furthermore, configuring the hybrid converter as the LDO comprises driving the gate of the pMOS with a buffer.

In some implementations, the method further includes providing a feedback voltage from the output capacitor through an error amplifier to the controller, wherein the error amplifier is part of the voltage loop.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
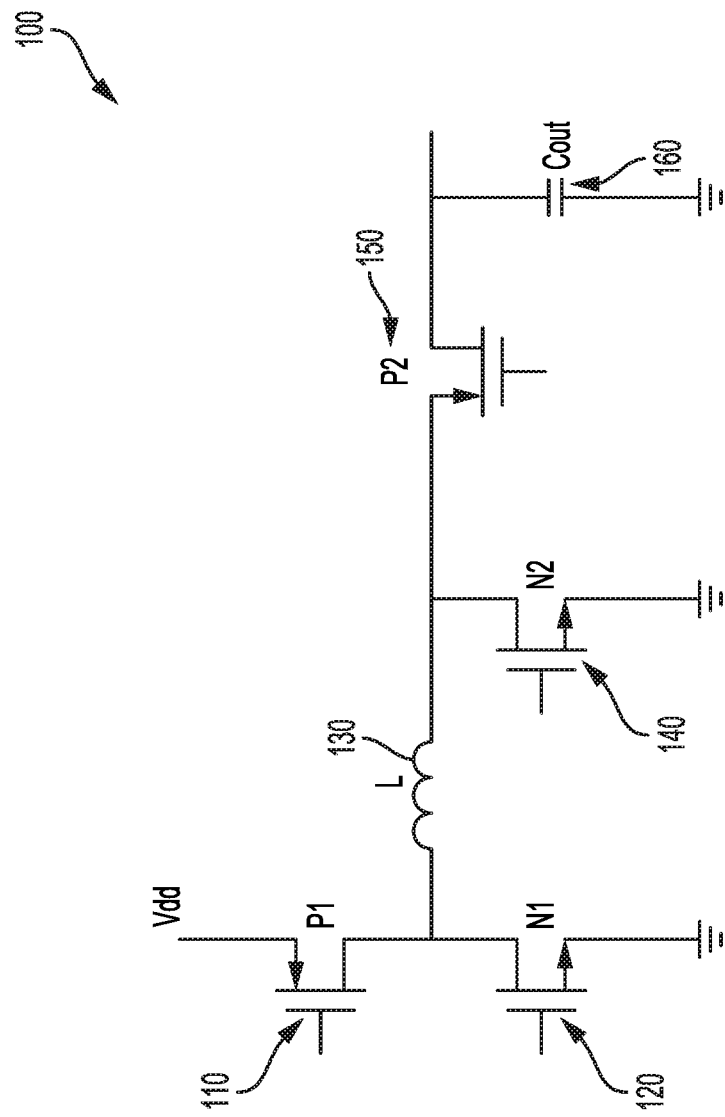
FIG. 1 shows an example of a conventional non-inverting buck-boost converter.
Figure 2:
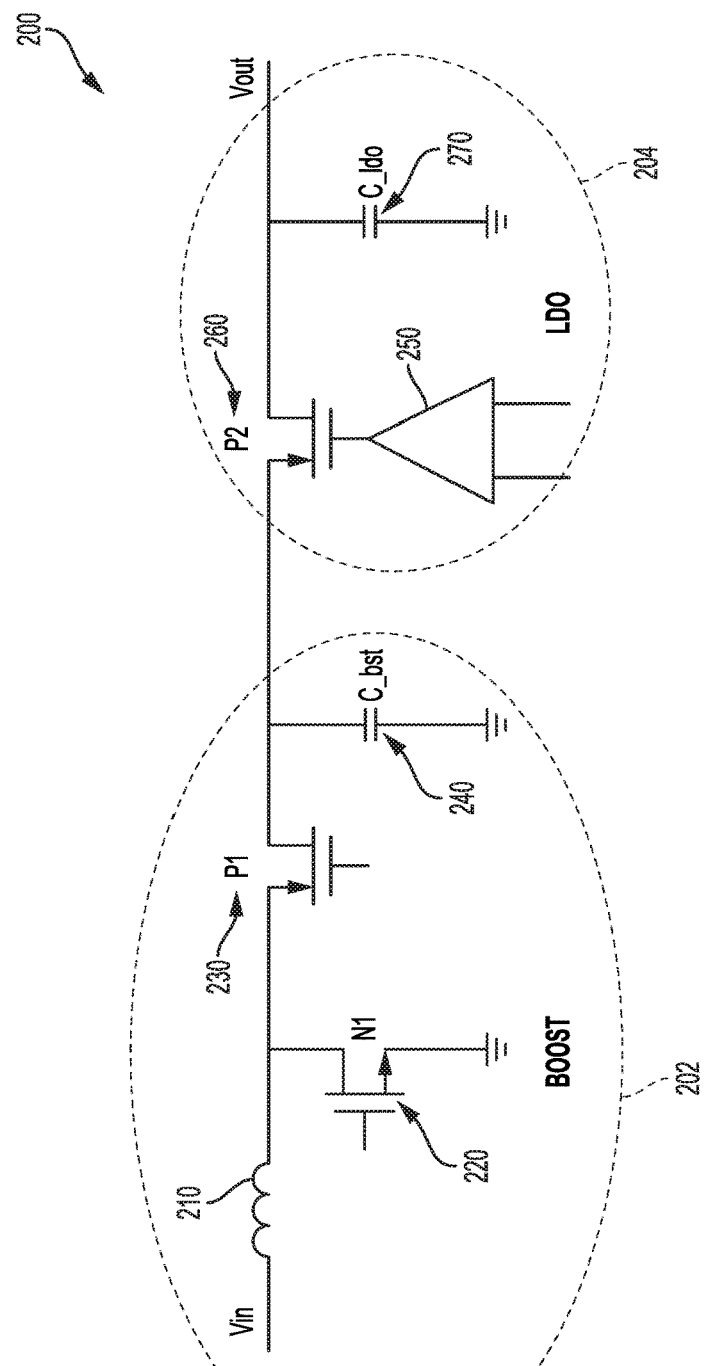
FIG. 2 shows a conventional converter 200 having a boost converter and a LDO coupled in series.
Figure 3:
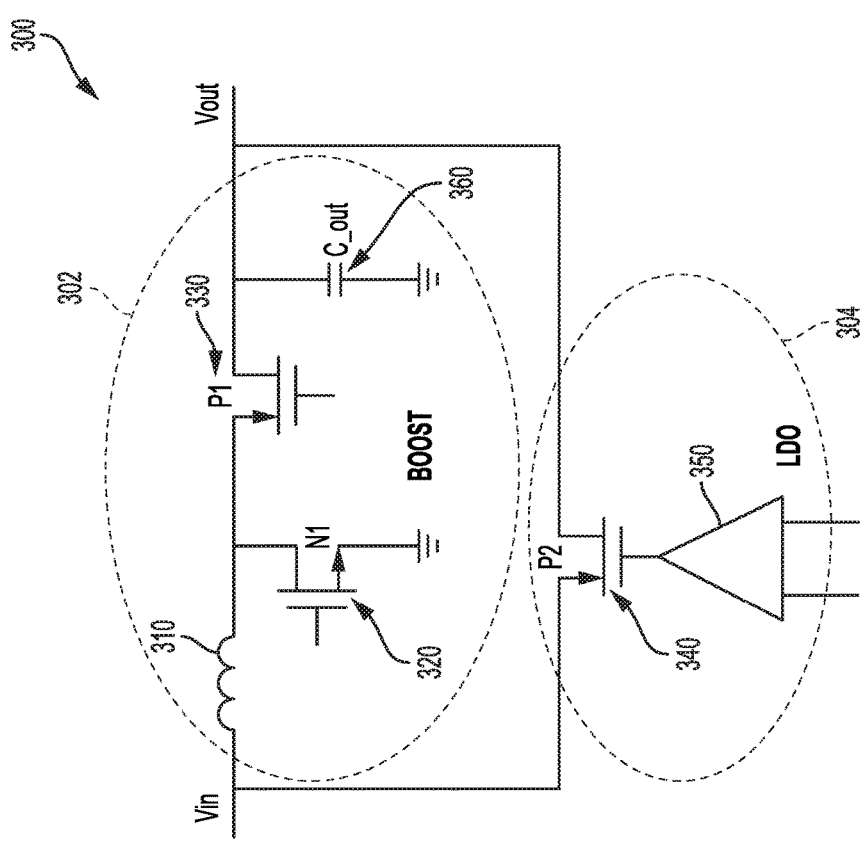
FIG. 3 shows a third conventional converter design that uses a boost converter and a LDO in parallel.
Figure 4:
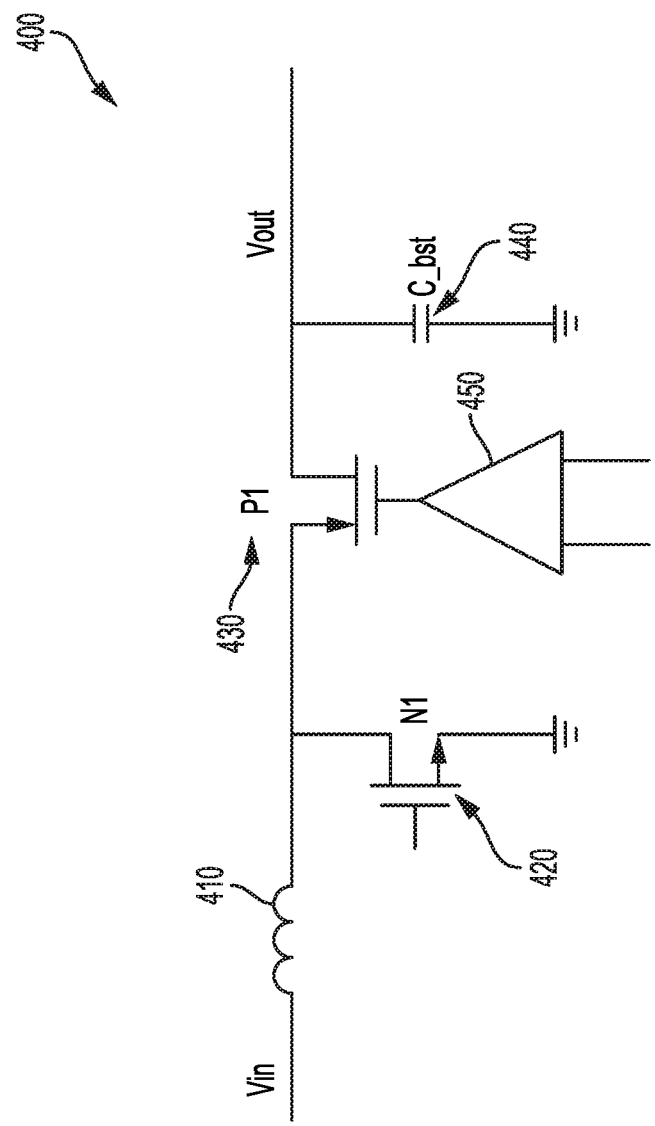
FIG. 4 below shows one implementation of a boost LDO hybrid converter.

FIG. 4 shows one implementation of a boost LDO hybrid converter. Boost LDO hybrid converter 400 includes an inductor 410, an n-type switch, such as an n-type metal oxide semiconductor device (nMOS) 420, a p-type switch, such as a p-type metal oxide semiconductor device (pMOS) 430, an output capacitor C_bst 440, and a controller 450. A first terminal of inductor 410 is configured to receive an input voltage Vin and a second terminal of inductor 410 is coupled to a drain of nMOS 420. A source of nMOS 420 is coupled to ground. The drain of nMOS 420 is further coupled to a source of pMOS 430. A gate of pMOS 430 is coupled to an output of controller 450. A drain of pMOS 430 is coupled to a first terminal of C_bst 440 to provide an output voltage Vout. A second terminal of C_bst 440 is coupled to ground. In some implementations, controller 450 can include a switch driver to drive the gate of pMOS 430 when the boost LDO hybrid converter 400 is configured as a boost converter. Controller 450 can further include a buffer to drive the gate of pMOS 430 when the converter 400 is configured as a LDO. In an alternate implementation, controller 450 can include a configurable circuit that can be configured as a switch driver when the converter 400 is in a boost mode or as a buffer when the converter 400 is in a LDO mode.

In operation, when Vin is less than Vout, boost LDO hybrid converter 400 is configured as a regular boost converter. Inductor 410, nMOS 420, pMOS 430, and C_bst are all on (or active) to boost Vin in order to generate Vout. When Vin is close to Vout, boost LDO hybrid converter 400 effectively goes into burst mode. In other words, boost LDO hybrid converter 400 may turn boost converter on for a few cycles, then turn boost converter off and wait for Vout to decay.

When Vout falls below Vin, boost LDO hybrid converter 400 is configured as a LDO with inductor 410 in the loop, pMOS 430 remains on, and nMOS 420 is switched off. In other words, inductor 410, pMOS 430, and C_bst 440 are re-used in the LDO configuration. By re-using inductor 410, pMOS 430, and C_bst 440 in the LDO configuration, boost LDO hybrid converter 400 does not require as much silicon area as the conventional hybrid converter designs discussed above.

Figure 5:
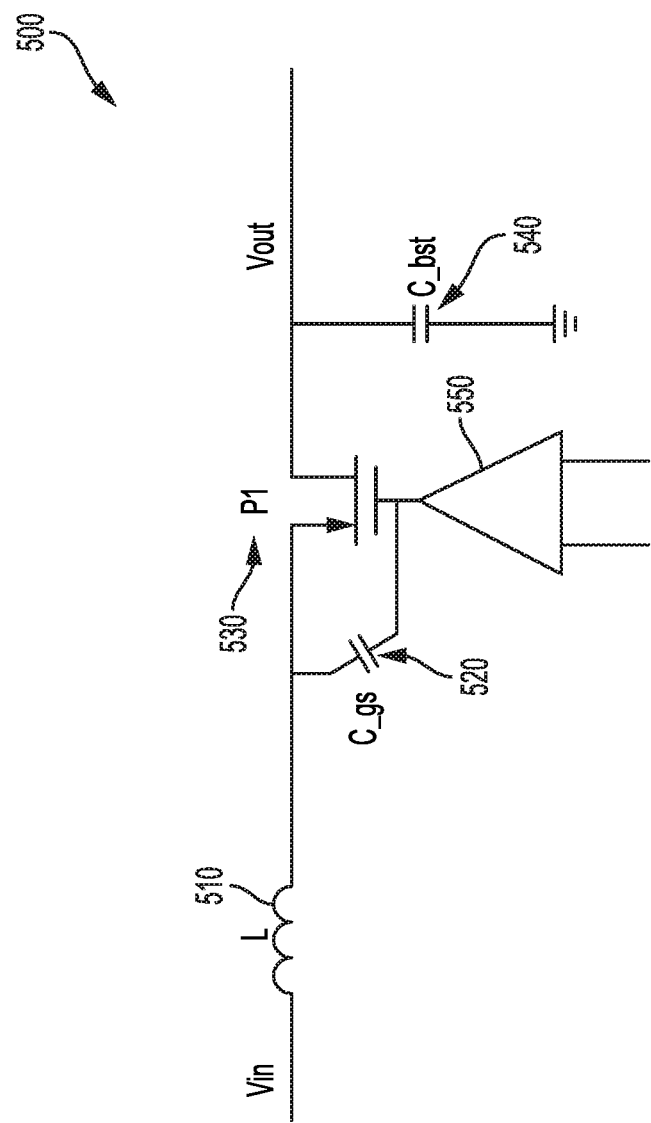
FIG. 5 shows one implementation of a circuit model illustrating C_gs in the LDO configuration of the boost LDO hybrid converter shown in FIG. 4.

Note that the LDO configuration retains inductor 410 in the loop. Furthermore, even though nMOS 420 is turned off, nMOS 420 still has parasitic gate source capacitance (C_gs). FIG. 5 shows one implementation of a circuit model illustrating C_gs in the LDO configuration of the boost LDO hybrid converter 400 shown in FIG. 4. In FIG. 5, circuit model 500 includes an inductor 510, a capacitor modeling a parasitic gate source capacitance C_gs 520, a pMOS P1 530, an output capacitor C_bst 540, and a controller 550. While inductor 510, P1 530, C_bst 540, and controller 550 are similar to inductor 410, P1 430, C_bst 440, and controller 450, respectively, C_gs 520 is added in the circuit model 500 to represent the parasitic gate source capacitance of nMOS N1 420. Inductor 510 and parasitic gate source capacitance C_gs 520 create double poles in the transfer function of the circuit model 500 as shown below:

$$Gm = gm/(1+s*gm*L+s^2*L*C\_gs)$$

The additional phase lag caused by the double poles severely affects the stability of the LDO loop. To compensate the loop, the bandwidth of circuit model 500 may be limited to a very low value, resulting in very poor transient performance. Accordingly, a hybrid boost converter with compensation is provided to mitigate the impact on bandwidth as discussed in detail below.

Figure 6:
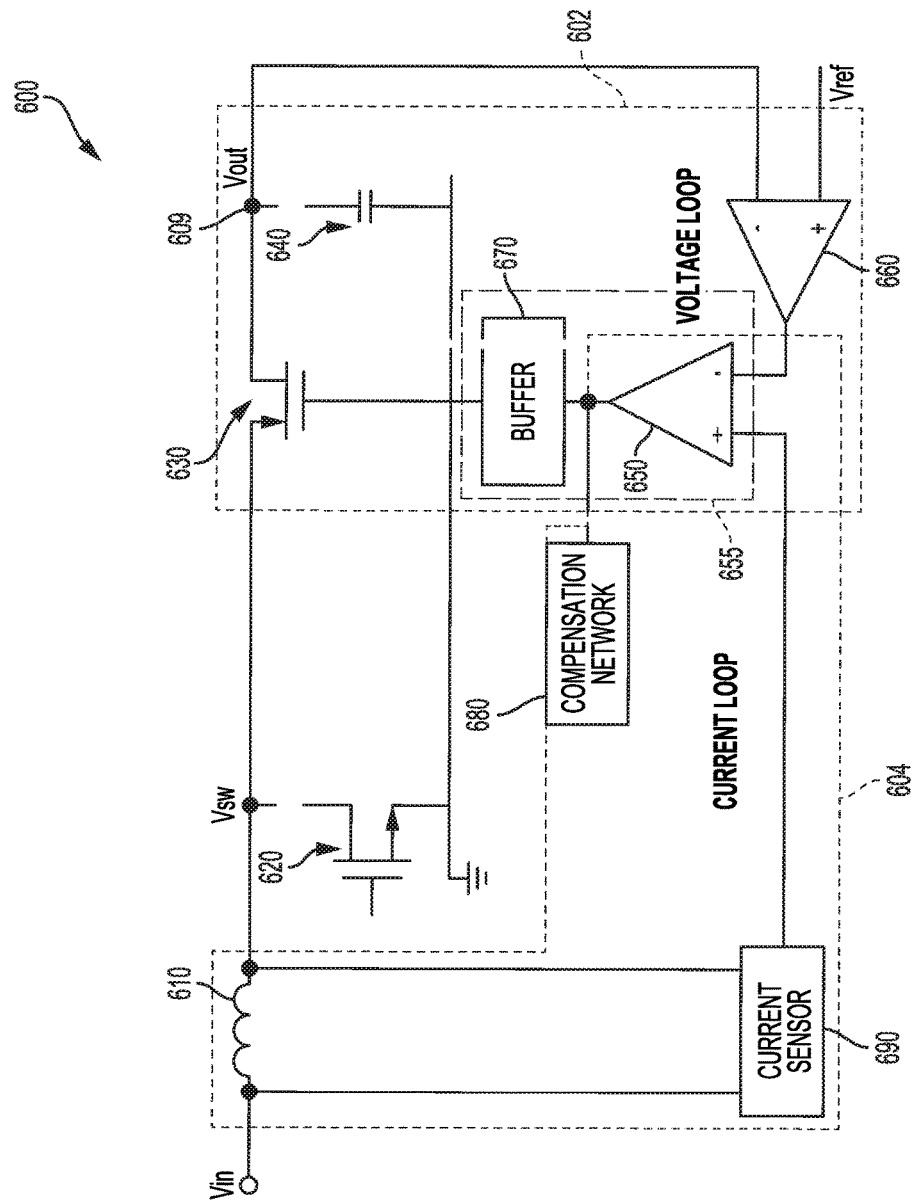
FIG. 6 shows one implementation of a hybrid boost converter with compensation that does not severely limit bandwidth.

FIG. 6 shows one implementation of a hybrid boost converter with compensation that does not severely limit bandwidth. Hybrid converter 600 includes an inductor 610, an nMOS 620, a pMOS 630, an output capacitor 640, a controller 650, an error amplifier 660, a buffer 670, a compensation network 680, and a current sensor 690. Inductor 610, nMOS 620, pMOS 630, output capacitor 640, and controller 650 are coupled to each other in a way similar to the hybrid boost converter 400 shown in FIG. 4. An output node 609 is further coupled to a negative input terminal of error amplifier 660. A positive input terminal of error amplifier 660 is configured to receive a reference voltage Vref. An output of error amplifier 660 is coupled to a negative input terminal of controller 650. Current sensor 690 is coupled across inductor 610 to measure a current through inductor 610. Then current sensor 690 generates a voltage signal proportional to, or indicative of, the inductor current measured and input the voltage signal to a positive terminal of controller 650. Buffer 670 is added between an output of controller 650 and pMOS 630 to drive a gate of pMOS 630. In some implementations, buffer 670 and controller 650 can be part of a controller 655 of hybrid converter 600. Alternatively, controller 655 can include a circuit configurable as a buffer in a LDO mode or a driver in a boost mode. Furthermore, compensation network 680 is coupled to the output of controller 650 to create one (1) zero and one (1) pole to compensate for the phase lag caused by inductor 610 and the parasitic gate source capacitance of nMOS 520 as discussed above with reference to FIG. 5. For example, compensation network 680 can include a RC (resistor-capacitor) network Type II compensator.

It should be appreciated that the components of hybrid boost converter 600 described above form two control loops to control hybrid converter 600 when operating as LDO. The two control loops are a voltage loop 602 and a current loop 604. The voltage loop 602 is formed by error amplifier 660, controller 650, buffer 670, pMOS 630, and output capacitor 640. The voltage loop 602 is configured to regulate the output voltage Vout and to set a current reference or threshold for the current loop. The current loop 604 is formed by inductor 610, current sensor 690, compensation network 680, and controller 650. The current loop 604 is configured to regulate the inductor current to the current reference set by the voltage loop 602.

With the current loop 604, the hybrid converter 600 can compensate the parasitic capacitance when operating in LDO mode with the boost inductor 610 in the current loop 604. Such dual loop control also helps stabilizing hybrid converter 600, allowing inductor 610 to be re-used in LDO mode. Further, the bandwidth achieved in this configuration can be orders of magnitude higher than the bandwidth of some of the conventional designs discussed above.

Figure 7:
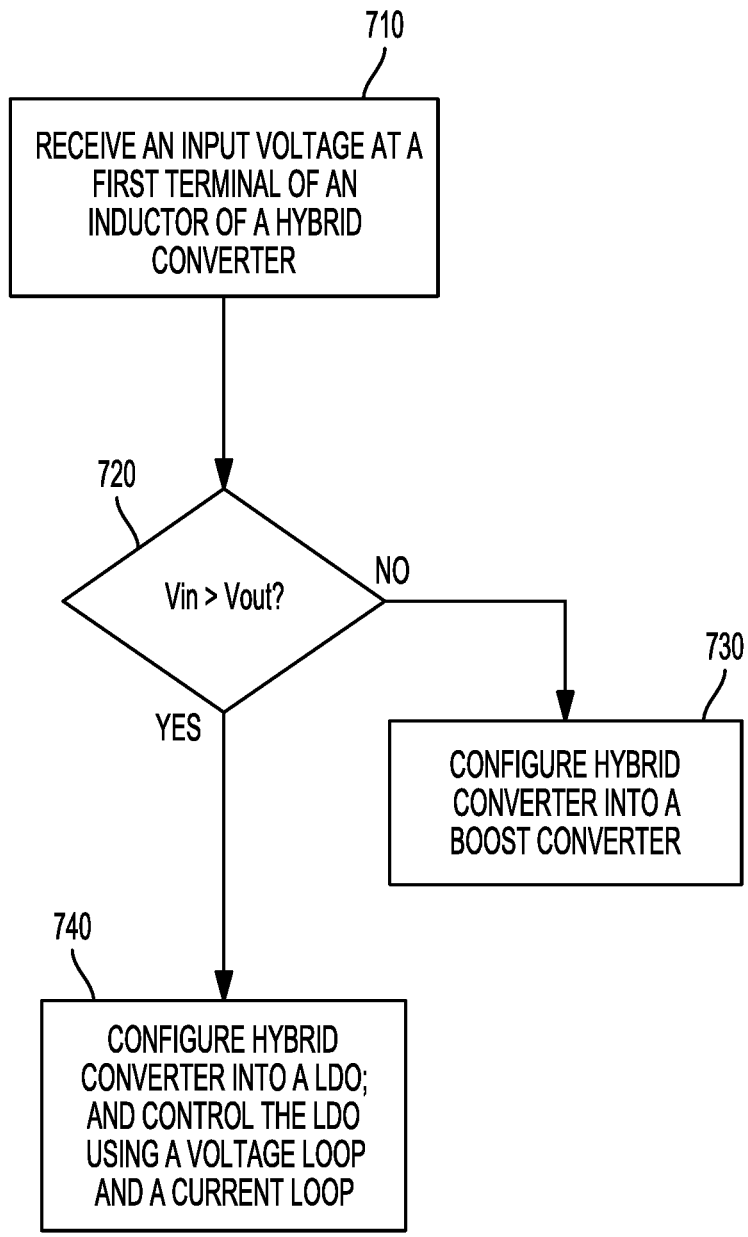
FIG. 7 shows a flow diagram of one implementation of a process to provide a hybrid converter.

FIG. 7 shows a flow diagram of one implementation of a process to provide a hybrid converter. The process can be implemented using semiconductor devices and circuits such as those shown in FIGS. 4 and 6. The process begins at block 710, where an input voltage is received at a first terminal of an inductor of a hybrid converter. At block 720, the process determines if an input voltage (Vin) is greater than an output voltage (Vout) of the hybrid converter. If Vin is not greater than Vout, then the process transitions to block 730, where the hybrid converter is configured into a boost converter to boost up Vin. If Vin is greater than Vout, then the process transitions to block 740, where the hybrid converter is configured into a LDO. In some implementations, the hybrid converter includes a current loop and a voltage loop to control the LDO such that the LDO can reuse the inductor of the hybrid converter while remaining substantially stable.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A hybrid converter, comprising:
   an inductor having a first terminal to receive an input voltage and a second terminal;
   an n-type metal oxide semiconductor device (nMOS) having a drain coupled to the second terminal of the inductor and a source coupled to ground;
   a p-type metal oxide semiconductor device (pMOS) having a gate, a drain, and a source, the source coupled to the drain of the first nMOS and the second terminal of the inductor;
   an output capacitor having a first and a second terminal, the first terminal coupled to the drain of the pMOS and the second terminal coupled to ground;
   a controller having a switch driver and a buffer, wherein the controller is configured to use the switch driver to drive the gate of the pMOS to configure the hybrid converter as a boost converter if the input voltage is less than an output voltage of the hybrid converter and to use the buffer to drive the gate of the pMOS to configure the hybrid converter as a low drop out linear voltage regulator (LDO) if the input voltage is greater than the output voltage;
   a current sensor coupled across the inductor to provide a feedback current signal to a positive terminal of the controller; and
   a compensation network coupled to an input of the buffer.

2. The hybrid converter of claim 1, wherein the current sensor, the inductor, the compensation network, and the controller are configured as a current loop in the LDO mode.

3. The hybrid converter of claim 2, further comprising:
   an error amplifier coupled between the output capacitor and a negative input terminal of the controller to provide a feedback voltage to the controller.

4. The hybrid converter of claim 3, wherein the error amplifier, the controller, the pMOS, and the output capacitor are configured as a voltage loop in the LDO mode.

5. A method comprising:
   receiving an input voltage at a first terminal of an inductor of a hybrid converter;
   if the input voltage is less than an output voltage of the hybrid converter, configuring the hybrid converter as a boost converter, wherein the configuring the hybrid converter as the boost converter comprises driving a gate of a p-type metal oxide semiconductor device (pMOS) with a switch driver, wherein a source of the pMOS is coupled to a second terminal of the inductor, and a drain of the pMOS is coupled to a first terminal of an output capacitor;

if the input voltage is greater than the output voltage, configuring the hybrid converter as a low drop out linear voltage regulator (LDO) by driving the gate of the pMOS with a buffer;
controlling the LDO using a voltage loop and a current loop;
sensing a current through the inductor, wherein the inductor is part of the current loop; and
providing a feedback signal based on the current sensed to a controller of the hybrid converter.

6. The method of claim 5, further comprising:
providing a feedback voltage from the output capacitor through an error amplifier to the controller, wherein the error amplifier is part of the voltage loop.

7. An apparatus, comprising:
means for receiving an input voltage at a first terminal of an inductor of a hybrid converter;
means for configuring the hybrid converter as a boost converter if the input voltage is less than an output voltage of the hybrid converter;
means for configuring the hybrid converter as a low drop out linear voltage regulator (LDO) if the input voltage is greater than the output voltage; and
means for controlling the LDO using a voltage loop and a current loop.

8. The apparatus of claim 7, further comprising:
means for sensing a current through the inductor, wherein the inductor is part of the current loop; and
means for providing a feedback signal based on the current sensed to a controller of the hybrid converter.

9. The apparatus of claim 8, wherein the means for configuring the hybrid converter as the boost converter comprises:
a switch driver to drive a gate of a p-type metal oxide semiconductor device (pMOS) of the hybrid converter, wherein a source of the pMOS is coupled to a second terminal of the inductor, and a drain of the pMOS is coupled to a first terminal of an output capacitor.

10. The apparatus of claim 9, wherein the means for configuring the hybrid converter as the LDO comprises:
a buffer having an input and an output, the output coupled to the gate of the pMOS to drive the pMOS; and
a compensation network coupled to the input of the buffer.

11. The apparatus of claim 10, further comprising:
means for providing a feedback voltage from the output capacitor to the controller.

12. The apparatus of claim 11, wherein the means for providing the feedback voltage comprises an error amplifier.

13. The apparatus of claim 12, wherein the error amplifier is part of the voltage loop.

* * * * *